Patented Apr. 22, 1930

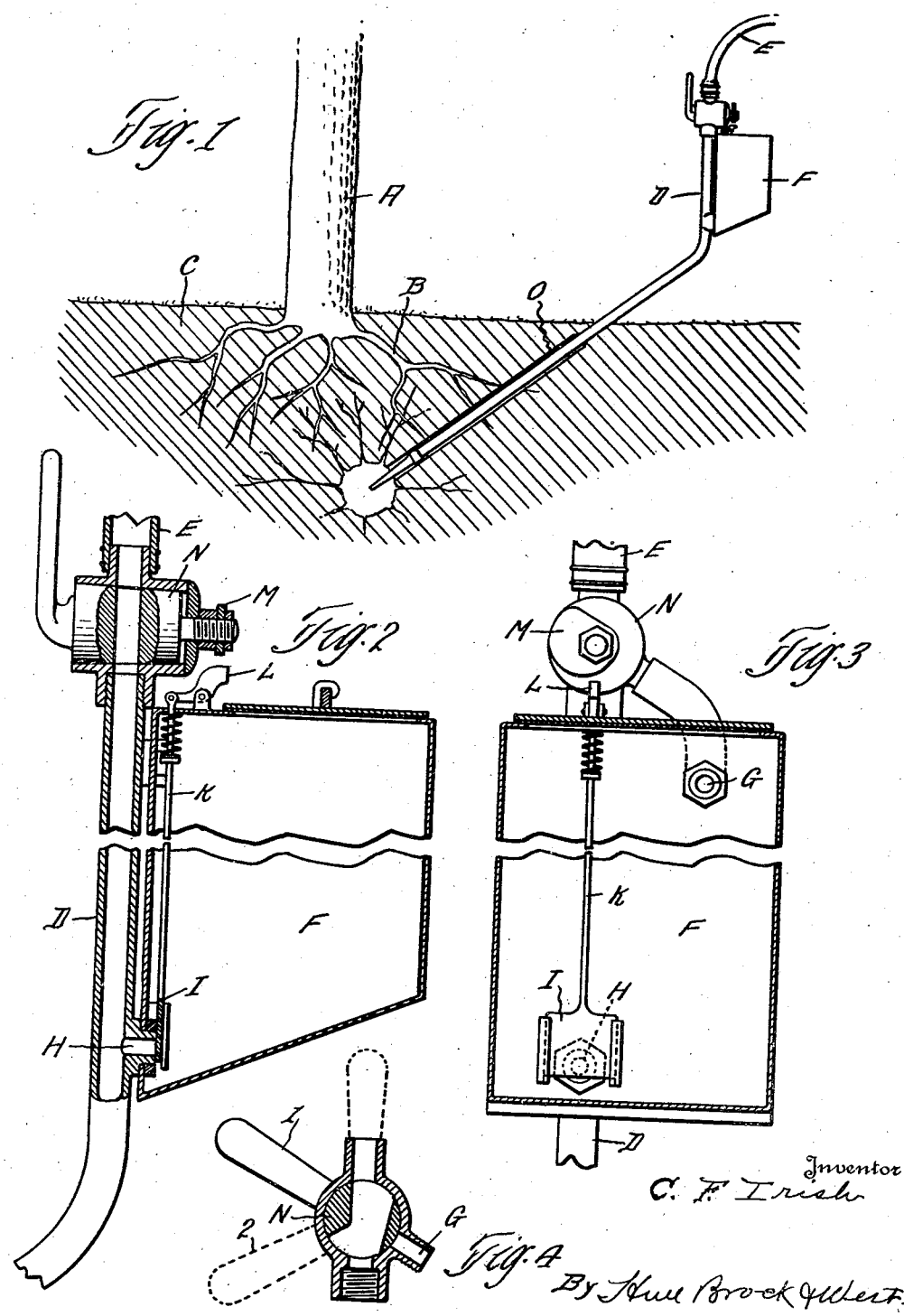

1,755,445

UNITED STATES PATENT OFFICE

CHARLES F. IRISH, OF BRATENAHL, OHIO

APPARATUS FOR PLANT CULTURE

Application filed November 28, 1927. Serial No. 236,125.

This invention relates to a means for aiding or facilitating the growth of trees and plants.

It is well known that the growth of a tree or plant is not only dependent upon the character of the soil but at times upon conditions either external or internal to which the soil may be subjected.

It is also well known that the soil surrounding trees and plants contains chemical compounds essential to the life and growth of all bacteria and pl..nts and that there are also present certain toxic matters which are injurious to the growth of plants and trees inasmuch as they prevent or retard the proper action of the bacteria which are beneficial in transforming these chemical compounds so that they are available as food for the trees and plants.

The object of my invention therefore is not only to supply the plant life giving or propagating ingredients to the soil but also to modify or eliminate the toxic conditions thereof.

In the maintenance of tree life, and particularly in transplanted trees care must be, and always has been, exercised in giving to the roots the proper plant food and under the best possible conditions, but it frequently happens that either due to surrounding soil conditions or for some other reason, the transplanted tree does not thrive and if its life is continued at all there is a very slow process in resuming its growth.

The object of my invention therefore is to provide a means for encouraging this growth, and while I have found the invention particularly useful in connection with transplanted trees, I have also found the same equally serviceable for improving the growth of trees and plants which have not been transplanted.

Broadly speaking, the invention consists in producing a suitable entrance or passageway into the earth at a point approximate the roots of the tree or plant and then injecting a definite quantity of compressed air into this passageway or orifice for the purpose of forcing a considerable quantity of air into the earth below the surface thereof and adjacent to the roots of the tree or plant.

The invention also contemplates the introduction of this compressed air for the purpose of providing a certain amount of pulsation or breathing action of the soil adjacent the roots whereby not only a definite quantity of air is forced into the earth but the earth is subjected to a pulsating or throbbing action which tends to open up cracks or fissures, loosening the earth to the desired extent and whereby a maximum amount of the compressed air may be injected into the earth for a considerable area and which air, in escaping, forces out the toxic gases which are generated by root and bacterial activities in the soil. The invention also contemplates injecting into the earth, simultaneously with the injection of the compressed air, a definite quantity of fertilizer or soil rectifier for the tree or plant.

The invention also contemplates using the openings or orifices for the purpose of ventilating the earth and also supplying conduits through which moisture may readily pass to the earth surrounding the roots.

By the use of this compressed air I have found that certain toxic conditions of the soil are immediately cured or modified. I have also found that the compressed air injected into the earth below the surface thereof, in considerable quantities, either supplies the necessary food for the trees or transforms the soil in such a manner that the plant food can more readily be taken up by the trees and toxic conditions corrected.

While I have referred to my invention as being used in connection with the growth of trees, it will be understood that the broad principle of the invention is applicable to the stimulation of all plant life having well defined root conditions, and which are sufficiently extensive to permit the introduction of a considerable volume of compressed air either among or around the same.

While I have shown only one form of apparatus for carrying out my invention, it will of course be understood that the broad idea may be carried out by variously formed apparatus.

In the drawings forming a part of the specification, Fig. 1 is a view showing one mode of utilizing my method; Fig. 2 is a vertical sectional view of one form of apparatus usable in connection with my method or process, and Figs. 3 and 4 show details of construction.

Referring to the drawings, A indicates a tree and B the roots thereof. C is the soil completely surrounding the roots of the tree. For the purpose of injecting compressed air into the soil I employ an air gun D which receives its compressed air through a pipe E connected with any suitable source of compression or compressed air supply. In case it is desired to apply fertilizer as well as compressed air, I provide a tank F containing any desired quantity of fertilizer or plant food or soil rectifier which tank is connected with the air gun by means of a passage G through which a definite quantity of compressed air can be forced into the tank and another passage H through which the fertilizer is forced through the gun and carried along with the compressed air into the earth.

A valve or slide I is arranged within the tank adjacent the passage H and normally closing said passage. This slide I has a rod K connected thereto which in turn is connected to a lever L actuated by a cam M which causes the slide to open when the valve N controlling the air supply is turned to a certain position. The valve N is provided with a suitable handle and by turning the handle in one position the compressed air will be cut off entirely from the gun and tank. By turning the same to the position indicated at 1, the compressed air will be supplied to the gun alone and by turning the same to the position shown at 2, the compressed air will be supplied to both the tank and gun and at the same time the slide valve will be actuated and consequently the compressed air will be supplied to the gun and likewise a definite quantity of fertilizer will be carried along from the tank to the gun into the orifice.

In carrying out the process a hole or passageway O is first made by means of a crowbar, rod or any other suitable tool, this opening or hole being projected a considerable distance into the earth at the point desired. The air gun is then inserted into this opening and the compressed air turned on with the result that a certain amount of compressed air is forced into the earth, and in addition to this I have found that a certain enlargement of the opening usually takes place at the discharge end of the gun and then by alternately cutting the supply of air off and on, particularly after this enlargement has taken place around the discharge end of the gun, certain well defined pulsations or upheavals are produced with the result of opening up the earth considerably beneath the surface thereof and whereby an increased quantity of compressed air can be injected into the earth through the various cracks or crevices produced beneath the surface during these pulsations or upheavals. By making the desired number of openings around the tree among the roots or adjacent thereto and shooting in definite quantities of air under pressure I have found that the growth of the tree is materially aided and this is particularly true of large trees transplanted as usual with a considerable quantity of roots.

I have also found that the introduction of this air not only facilitates the growth of the tree but accelerates the availability of the plant food and likewise modifies or eliminates certain toxic conditions of the soil so that the bacteria can produce the necessary steps towards changing soil minerals into available plant food. This rectification of toxic soil conditions I have frequently remedied by treating the earth adjacent trees of long standing and my invention is also particularly adapted for the treatment of soils overcharged with moisture or soils completely deprived of moisture due to the fact that the tree is entirely surrounded by pavement.

After the air gun has been withdrawn the holes or passages can be filled with any suitable coarse material through which air can continue to pass down into the crevices created in the soil and also gases contained within the soil can escape through these openings or passageways which to this extent may be termed ventilating passages. These openings or passages, thus filled with coarse material, also help in the distribution of rain or water to the lower roots during the summer months and this is particularly useful when the surrounding surface would prevent such penetration.

By the use of my invention it will be seen that the entire root area can be thoroughly aerated, oxygenized, drained and fertilized without disturbing the surface covering.

Having thus described my invention, what I claim is:

A device for the purpose set forth comprising an air gun adapted to be connected with a suitable supply of compressed air, and including a two-way valve for controlling the flow of the air through said gun, a fertilizer containing receptacle attached to said gun, means for connecting the second outlet of said valve with said receptacle, means connecting the lower part of said receptacle to said gun and providing a passage therebetween, and a valve for closing said passage.

In testimony whereof, I hereunto affix my signature.

CHARLES F. IRISH.